May 27, 1952  R. A. WANGEMAN  2,598,626
PIE DOUGH TRIMMER AND SEALER
Filed Sept. 18, 1947

Inventor
Robert Alexander Wangeman

By *Clarence A. O'Brien and Harvey B. Jacobson*
Attorneys

Patented May 27, 1952

2,598,626

UNITED STATES PATENT OFFICE 2,598,626

PIE DOUGH TRIMMER AND SEALER

Robert Alexander Wangeman, Sheboygan, Wis.

Application September 18, 1947, Serial No. 774,876

3 Claims. (Cl. 107—49)

This invention relates to improvements in pie dough trimmers and sealers.

An object of the invention is to provide an improved pie dough trimmer and sealer which will be manually operable about the edge of a pie plate when a pie has been made and the dough crust placed in position upon the pie filling for simultaneously crimping and sealing the edge of the pie and for trimming the extra dough from the edge of the pie plate.

Another object of the invention is to provide an improved portable hand operated pie dough trimmer and sealer including an operating shaft having an operating knob and ratchet wheel secured thereon, together with an interconnected beveled crimping gear and circular or disk shaped trimming knife rotatably mounted upon said shaft, and a resilient dog or pawl pivotally mounted upon said knife for engagement with said ratchet wheel for driving said crimping or sealing gear and knife as it is rolled about the peripheral edge of a pie to trim and seal the same.

A further object of the invention is to provide an improved pie crust trimmer and sealer which will be highly efficient in operation, and relatively inexpensive to manufacture and produce.

Other objects will appear as the description proceeds.

In the accompanying drawings which form a part of this invention,

Like characters of reference are used throughout the following specification and the accompanying drawings to designate corresponding parts.

Figure 1:
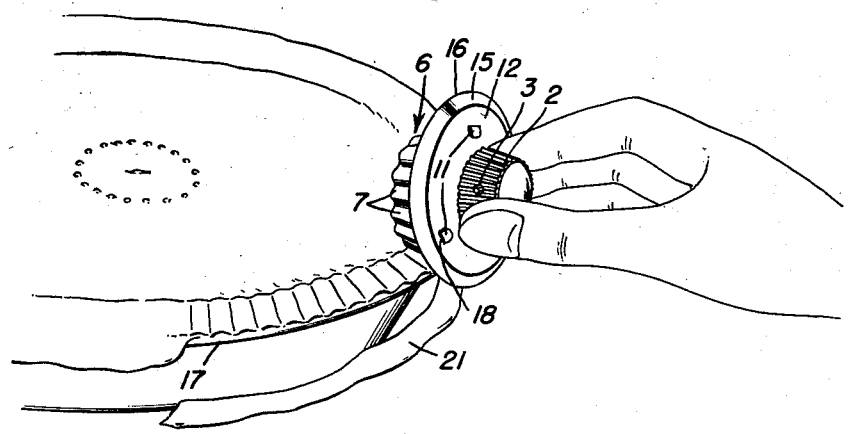
Figure 1 is a perspective view of a pie and the improved pie dough trimmer and sealer shown in operative use thereon.
Figure 2:
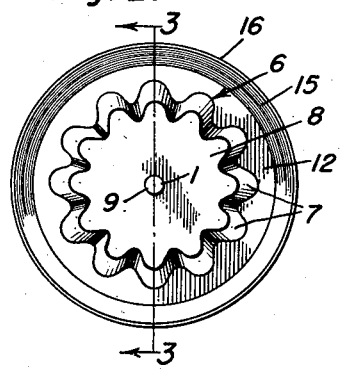
Figure 2 is a front elevation of the improved pie dough trimmer and sealer.
Figure 3:
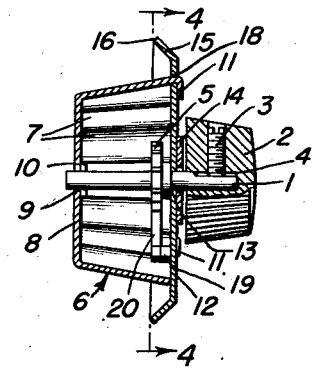
Figure 3 is a sectional view taken on the line 3—3 of Figure 2.
Figure 4:
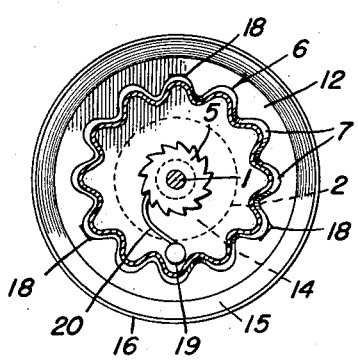
Figure 4 is a sectional view taken on the line 4—4 of Figure 3.

In carrying out the invention, there is provided an improved form of portable and manually operable pie dough trimmer and sealer including an operating shaft 1 upon one end of which is mounted an operating knob 2, the same being secured in fixed position thereon by means of a set screw 3 whose inner end is adapted to seat in the longitudinally extending slot or keyway 4 formed in the outer end of said shaft 1.

A ratchet wheel 5 is suitably fixed upon the shaft 1 intermediate its ends, and is rotatable therewith.

A beveled crust crimping and sealing gear 6 is formed with a plurality of tapered flutes or ribs 7, and is formed with a closed outer end 8 which is centrally bored to provide a bearing 9 for the operating shaft 1. A locking pin 10 will be disposed through a transverse opening (not shown) adjacent the end of the shaft 1 to lie next to the inner surface of the end 8 to limit the inward movement of said crust crimping and sealing gear 6.

A plurality of inwardly directed locking tabs 11 are formed on the inner edge of the crust crimping and sealing gear 6 for purposes hereinafter described.

A disk shape or circular dough trimming knife 12 is provided with a central opening or aperture 13 for positioning over the shaft 1 adjacent the ratchet wheel 5, and a washer 14 is also disposed over the shaft 1 between the knife 12 and the operating knob 2. The peripheral edge of the knife 12 is bent inwardly or beveled as at 15 to provide a trimming or cutting edge 16 for contacting the edge of a pie plate 17 when the device is in operation.

A plurality of slots 18 are formed through the trimming knife 12 for receiving the attaching tabs 11 on the adjacent end of the sealing gear 6, the ends of said tabs being bent inwardly at right angles to lock the sealing gear 6 to the cutting or trimming blade or knife 12.

Secured to the inner surface of the trimming blade or knife 12, is a pin or stud 19 upon which a resilient dog or pawl 20 is mounted for engagement with the teeth in the ratchet wheel 5 for automatically coupling the sealing gear 6 and the trimming blade 12 to the shaft 1 when the operating knob 2 is rotated.

In operation, the pie to be sealed and the surplus dough 21 will be engaged by the improved pie dough trimmer and sealer as shown in Figure 1 of the drawings, and the operating knob 2 will be rotated to simultaneously seal the pie and trim the surplus dough from the edges thereof. It will be apparent that the beveled sealing gear will crimp the edge of the pie dough crust together in ridges whose inner and outer ends are formed at different radial distances from the center of the pie. As the device is operated, the sealing and the trimming of the surplus dough from the edge of the pie will be quickly and simultaneously effected by the beveled gear 6, and by the engagment of the blade edge 16 with the peripheral edge of the pie plate 17. A ratchet is included in the make-up of the mechanism so that the knife and imprinting or sealing gear move forward with the knob but remain stationary relative to the edge of the pie when the knob is returned to a new starting position, as by partially rotating the pie with the other hand, while the knob is held with one hand. This allows operation of the device to be continuous and without breaking contact between the device and the pie crust, and without breaking the pattern imprinted on the edge of the pie. It is applicant's contention that the device would not be practical without the use of a ratchet because this ratchet allows an easy return of the fingers of the operating hand to a new starting position, eliminating the necessity of breaking hold on the knob and breaking the pattern, but making it rather a continuous and quick procedure.

From the foregoing description, it will be apparent that there has been devised and provided a highly efficient form of pie dough trimming and sealing implement which may be manufactured at a relatively low cost.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

1. An improved pie dough trimming and sealing implement including a rotatable shaft, an operating knob fixed to one end thereof, a pie dough trimming knife rotatably mounted on said shaft, a beveled and fluted pie edge sealing gear rotatably mounted on said shaft, means for coupling said knife and the gear together, and means for coupling said knife and gear to said shaft for rotation therewith when said operating knob is rotated in one direction, said coupling means being inoperative when the knob is rotated in the opposite direction.

2. An improved pie dough trimming and sealing implement including a rotatable shaft, an operating knob fixed to one end thereof, a pie dough trimming knife having a beveled cutting edge rotatably mounted on said shaft, a beveled and fluted pie edge sealing gear rotatably mounted upon said shaft, means for coupling said knife and the gear together, and a ratchet wheel and associated pivoted pawl disposed respectively on said shaft and knife for coupling said knife and gear to said shaft for rotation therewith when said operating knob is rotated in one direction, said coupling means being inoperative when the knob is rotated in the opposite direction.

3. An improved pie dough trimming and sealing implement including a rotatable shaft, an operating knob fixed to one end thereof, a pie dough trimming knife having a beveled cutting edge rotatably mounted on said shaft, a beveled and fluted pie edge sealing gear rotatably mounted upon said shaft, means for coupling said knife and gear togther, a ratchet wheel secured to said shaft, and a resilient pawl pivotally supported upon said knife for engagement with said ratchet wheel for automatically coupling said knife and gear to said shaft for rotation therewith when said operating knob is rotated in one direction, said coupling means being inoperative when the knob is rotated in the opposite direction.

ROBERT ALEXANDER WANGEMAN.

REFERENCES CITED

The following references are of record in the file of this patent:

UNITED STATES PATENTS

| Number | Name | Date |
| --- | --- | --- |
| 149,946 | Mockli | Apr. 21, 1874 |
| 456,042 | Landrith | July 14, 1891 |
| 537,123 | Mills | Apr. 9, 1895 |
| 727,269 | Berkstresser | May 5, 1903 |
| 1,154,235 | Cobb | Sept. 21, 1915 |
| 1,535,300 | Forster | Apr. 28, 1925 |
| 1,821,879 | Calpin | Sept. 1, 1931 |
| 2,369,452 | Gamache | Feb. 13, 1945 |